July 24, 1962 W. H. WELLS 3,046,023

PHONOGRAPH ATTACHMENT FOR GAUGING STARTING POSITION OF THE TONE ARM

Filed April 4, 1960

INVENTOR.

WILLIAM H. WELLS

BY

Flam and Flam

ATTORNEYS.

United States Patent Office 3,046,023

Patented July 24, 1962

3,046,023

PHONOGRAPH ATTACHMENT FOR GAUGING STARTING POSITION OF THE TONE ARM

William H. Wells, Woodland Hills, Calif., assignor to Newcomb Electronics Corp., Los Angeles, Calif., a corporation of California Filed Apr. 4, 1960, Ser. No. 19,611
8 Claims. (Cl. 274—14)

This invention relates to a phonograph attachment that facilitates the use of phonographs for classroom instruction.

For such purposes, it is often necessary to start the reproduction at an intermediate portion of the record disk.

It is one of the objects of this invention to make it possible, by appropriate scales, to set the needle of the tone arm quite closely to the desired point where the reproduction is to begin.

It is another object of this invention to provide a simple and inexpensive device for accomplishing these results, the device being readily installable on existing phonographs.

This invention possesses many other advantages, and has other objects which may be made more clearly apparent from a consideration of one embodiment of the invention. For this purpose, there is shown a form in the drawings accompanying and forming part of the specific specification. This form will now be described in detail, illustrating the general principles of the invention; but it is to be understood that this detailed description is not to be taken in a limiting sense, since the scope of the invention is best defined by the appended claims.

Referring to the drawings.

A conventional form of turntable 1 (FIG. 2) may be utilized upon which is supported a disk record 2. This turntable 1 is supported for rotation in the usual manner upon a flat support 3, such as the top of a cabinet.

Figures 1, 7:
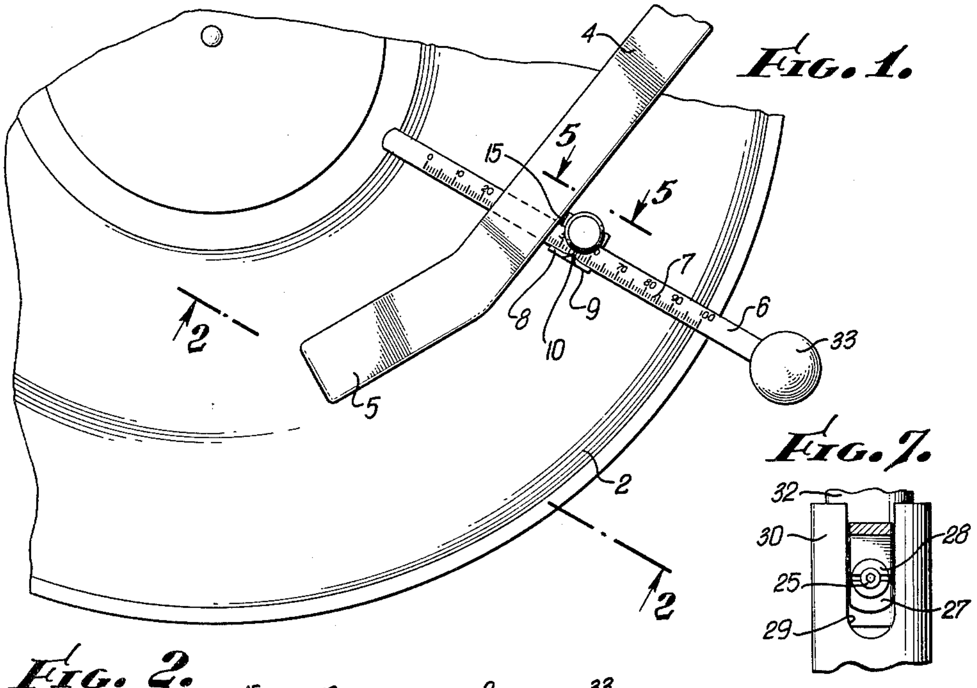
FIGURE 1 is a fragmentary plan view, illustrating an embodiment of the invention in connection with a phonograph.
FIG. 7 is a fragmentary elevation taken from the left side of FIG. 3.
Figure 2:
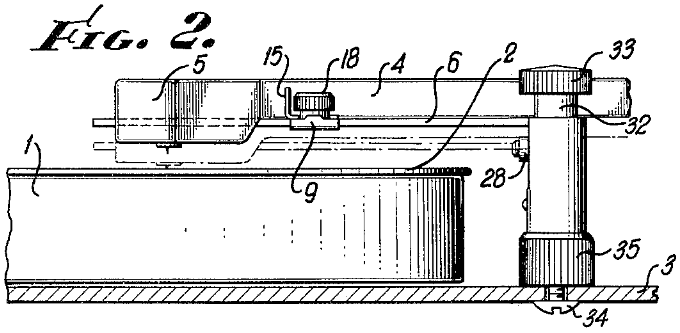
FIG. 2 is a view taken from a plane corresponding to line 2—2 of FIG. 1.

As illustrated in FIGS. 1 and 2, a tone arm 4, carrying a sound head 5, is adapted to cooperate with the grooves in the record disk 2.

It is advantageous to make it possible to place the tone arm 4 into cooperative relationship at a specified part of the record disk 2. For this purpose, a support 6 in the form of a metal strip is arranged to project in a radial direction across the grooved face of the record disk 2, and beneath arm 4. This support 6 has scale marks 7 adapted, in a manner to be hereinafter described, to be used for starting reproduction at a desired intermediate point of the record.

As shown most clearly in full lines in FIG. 2, the support 6 may assume an elevated position to hold the tone arm 4 out of cooperative relationship with the record disk 2. In the phantom-line position, the support 6 is moved downwardly sufficiently to permit the sound head 5 to drop onto the disk 2 into cooperative relationship with the groove.

The support 6 is provided with a slider 8 (see also FIG.

Figure 5:
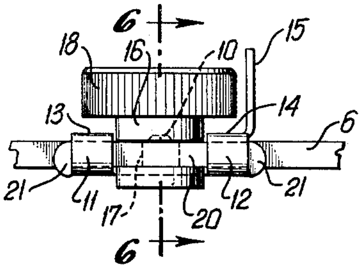
FIG. 5 is a fragmentary enlarged elevation, taken from a plane corresponding to line 5—5 of FIG. 1.
Figure 6:
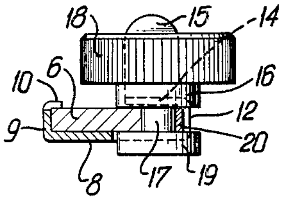
FIG. 6 is a sectional view, taken along a plane corresponding to line 6—6 of FIG. 5.

6). This slider 8 has a side flange 9 carrying an integrally formed inwardly directed pointer 10 adapted to cooperate with the scale marks 7. The slider 8 is confined for longitudinal movement along support 6 by spaced upturned portions or ears 11 and 12 (FIG. 5) attached to the slider and having inwardly turned tabs 13 and 14 overlying the top surface of support 6.

The inwardly turned tab 14 is provided with an integral upright stop member or abutment 15 adapted to engage a side surface of the tone arm 4. This stop, therefore, serves to position the tone arm 4 in the proper location to begin the reproduction at any desired point, represented by the scale mark 7 which is in cooperative position with pointer 10.

Manual adjustment of the slider 9 and its associated pointer 10 may be effected by a friction drive. Thus, a post 16 having an intermediate reduced portion 17 is adapted to be rotated by the aid of a knurled knob 18.

The periphery of reduced portion 17 is resiliently urged into frictional driving engagement with an edge of the scale or support 6 by the aid of a leaf spring 20 entering the annular groove formed by the lower portion 19 of post 16. The central portion of the spring is bowed to fit around the reduced portion 17. The ends of the spring are formed as hooks 21 held by the ears 11 and 12. This spring may be made of Phosphor bronze or the like.

Figure 4:
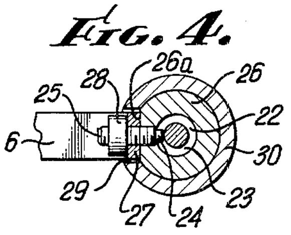
FIG. 4 is a sectional view, taken along a plane corresponding to line 4—4 of FIG. 3.
Figure 3:
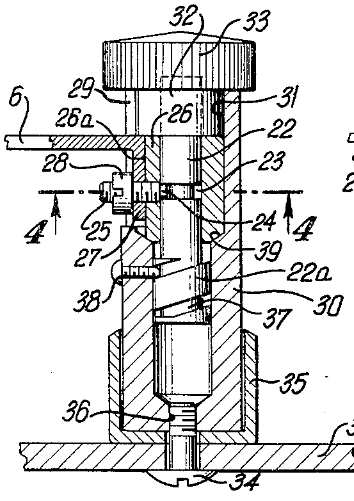
FIG. 3 is an enlarged sectional view of a portion of the apparatus illustrated in FIG. 2.

For raising and lowering the support 6, use is made of an elevating structure including a post 22 (FIGS. 3 and 4). This post is rotatable in a sleeve 26 that is guided for vertical movement in a barrel 30. The post has an annular groove 23 adapted to be engaged by the inner cylindrical end 24 of a stud 25. This stud 25 is threaded radially into sleeve 26. Appropriate means, hereinafter described, confines the sleeve 26 against rotation. Rotation of the post 22, as hereinafter explained, causes the post to rise upwardly, carrying with it the sleeve 26. Attached to a flattened part 26*a* of the sleeve 26 is a part 27 integral with the support 6, and extends downwardly. The stud 25 passes with clearance through this part 27, and is held firmly against flattened portion 26*a* of the sleeve 26 by the aid of a nut 28. This nut 28 may be circular with peripheral slots for engagement of a tightening and loosening tool.

As shown most clearly in FIGS. 4 and 7, the part 27 rides in a slot 29 formed in the barrel 30. This confines the sleeve 26 against rotation. Within barrel 30 the post 22 is journalled. The upper portion of the barrel is provided with a bore 31 for the accommodation of the cylindrical extension 32 formed on a knurled head 33. This head 33 has a central recess for accommodating the upper end of post 22, as by a drive fit. The barrel 30 is held in an upright position on the support 3 by the aid of a screw 34. This screw passes through a socket member 35 and engages a threaded aperture 36 in the bottom of the barrel 30.

In order that angular movement of the post 22, by aid of head 33, result in raising and lowering of the post 22, a spiral groove 37 is formed in the lower enlarged part 22*a* of the post. In this spiral groove there is engaged the inner end of a screw 38, passing radially through the lower portion of the wall of the barrel 39. In the upper position of the post 22, as illustrated in full lines in FIG. 2, the end of the screw 38 engages the bottom portion of the groove 37; and since this groove terminates in a dead end, a limit is formed to the upward movement.

A reverse turning of the member 33 causes the post 22 to travel downwardly to the position of FIG. 3. In this position, the lower tapered end of sleeve 26 bottoms upon a countersunk surface 39.

In the event that there be any wear or too great a clearance between the depending portion 27 of the support 6 and the sides of slot 29, the nut 28 may be loosened and the support 6 turned about the axis of the stud 25 until the clearance is taken up.

In use, the operator of the phonograph moves the pointer 10 to a definite scale division of the scale 7. This is accomplished while the support 6 is in the raised position of FIG. 2. The tone arm 4 is then moved into contact with the stop or abutment 15, and then the knob 33 is turned until the support 6 is lowered out of contact with the tone arm 4. The tone arm 44 will then be in position to reproduce sound at the prescribed or desired place of the record disk 2.

The inventor claims:

1. A phnograph attachment for determining the starting position of the tone arm of the phonograph, comprising: a tone arm support; a stop for the tone arm adjustably carried by the support; a manually operable rotatable member having an axis normal to the support; and means operating by rotation of said member in one direction to raise said support, and in the other direction to lower said support.

2. A phonograph attachment for determining the starting position of the tone arm of the phonograph, comprising: a tone arm support; said support having scale divisions; a slide mounted on the support and having a pointer cooperating with the scale, as well as an abutment against which the tone arm may rest; an angularly movable post having a peripheral spiral groove; said support being carried by the post; a stationary pin engaging the spiral groove, whereby angular movement of the post serves to raise and lower the support; and means confining the movement of the support in a direction parallel to the axis of the post.

3. The combination as set forth in claim 2, in which the means confining the movement of the support includes a sleeve surrounding the post; a pin passing through the sleeve and into an annular groove in the post, the support being joined to the sleeve; and a barrel having a slot guiding the motion of the support.

4. In a phonograph attachment for determining the starting position of the tone arm of the phonograph, comprising: a tone arm support having a longitudinal edge; a slider movable longitudinally on the support; an abutment for the tone arm carried by the slider; said slider having spaced ears extending over the edge; a flat spring member carried by the ears; a member urged against the edge by the spring member; and manually manipulable means attached to the member for moving the slider.

5. The combination as set forth in claim 4, in which the member urged by the spring is cylindrical and rotatable by the manually manipulable means, for causing the cylindrical member to roll on the edge of the support.

6. In a phonograph attachment for determining the starting position of the tone arm of the phonograph: a tone arm support; a stop for the tone arm adjustably carried by the support; and manual means for raising and lowering the support to lift and lower the tone arm, comprising a post having a spiral groove, and a stationary pin engaging the groove, said post being angularly movable so as to raise and lower the support.

7. In a phonograph attachment for determining the starting position of the tone arm of the phonograph; a tone arm support; a stop for the tone arm adjustably carried by the support; and manual means for raising and lowering the support to lift and lower the tone arm, comprising: a post having a spiral groove, a stationary pin engaging the groove, said post being angularly movable so as to raise and lower the support; said combination also including a barrel for supporting the pin and for rotatably supporting the post; said barrel having a vertical slot; said scale having a portion riding in the slot; and means whereby the scale portion moves in the groove in unison with the rise and fall of the post.

8. In a phonograph attachment for determining the starting position of the tone arm of the phonograph; a tone arm support; a stop for the tone arm adjustably carried by the support; and manual means for raising and lowering the support to lift and lower the tone arm, comprising: a post having a spiral groove, a stationary pin engaging the groove, said post being angularly movable so as to raise and lower the support; said combination also including a barrel for supporting the pin and for rotatably supporting the post; said barrel having a vertical slot; said scale having a portion riding in the slot; and a pin carried by the scale part engaging an annular groove in the post for causing the scale to be lowered and raised with the post as the post is rotated.

References Cited in the file of this patent

UNITED STATES PATENTS 2,969,241 Wyrod ---------------- Jan. 24, 1961

FOREIGN PATENTS 790,939 Great Britain ---------- Feb. 19, 1958
796,673 Great Britain ----------- June 18, 1958